United States Patent [19]

Bruzzese et al.

[11] 3,859,435

[45] Jan. 7, 1975

[54] BASIC DERIVATIVES OF LYSOZYME

[75] Inventors: Tiberio Bruzzese; Giuseppe Ghieimetti; Rodolfo Ferrari, all of Milan, Italy

[73] Assignee: SPA Societa Prodotti Antibiotici, S.p.A., Milan, Italy

[22] Filed: Apr. 29, 1971

[21] Appl. No.: 138,759

[30] Foreign Application Priority Data

July 23, 1968 Great Britain.................... 35030

Related U.S. Application Data

[62] Division of Ser. No. 818,156, April 21, 1969, abandoned.

[52] U.S. Cl. ................................................ 424/94
[51] Int. Cl. .......................................... A61k 19/00
[58] Field of Search ....................................... 424/94

[56] References Cited

FOREIGN PATENTS OR APPLICATIONS 1,093,877  12/1967   Great Britain ....................... 424/94

OTHER PUBLICATIONS

Fraenkel-Conrat et al., J. Biol. Chem., Vol. 161, pp. 259–268, 1945.

Roche et al., Bull. Soc. Chim. Biol., Vol. 36, pp. 85–94, 1954.

Chemical Abstracts, Vol. 54, entry 17648g, 1960.

*Primary Examiner*—Sam Rosen
*Attorney, Agent, or Firm*—Wenderoth, Lind & Ponack

[57] ABSTRACT

There are described now basic derivatives of lysozyme which are characterised by an anti-viral activity.

1 Claim, No Drawings

BASIC DERIVATIVES OF LYSOZYME

This application is a division of Ser. No. 818,156, filed Apr. 21, 1969, now abandoned.

BACKGROUND OF THE INVENTION

Among the chemical properties of the lysozyme molecule, important biological roles are played by its enzymatic activity and by its strong positive charge. This is due to the high content of dibasic amino acid residues in the lysozyme molecule, namely, 11 arginine residues, 6 lysin residues and 1 histidine residue, which are only partially neutralised by dicarboxylic amino acids which total 10 against the 18 dibasic amino acids.

Owing to the biological interest of the basic properties of lysozyme, several lysozyme derivatives have been prepared and studied which have a high basic charge in comparison with the lysozyme molecule per se.

Two of these derivatives, lysozyme mono-methyl ester and mono-guanidyl-lysozyme, are already known, they having been synthesised in a series of general chemical researches concerned with methylation and guanidylation of proteins and polypeptides (Fraenkel-Conrat M., Olcott H.S., J. Biol. Chem., 161, 259/1945; Roche J., Mourgue M., Baret R., Bull. Soc. Chim. Biol., 36, 85/1954). However, they have not been studied from the biological viewpoint. Furthermore, some procedures of these reactions, namely those of guanidylation, were such as to lead to a complete denaturation of the lysozyme molecule, the final product obtained being biologically inactive.

SUMMARY OF THE INVENTION

As a result of our investigations, under various experimental conditions, in the field of lysozyme methyl- and guanidyl-derivatives, we have found certain new derivatives, in addition to the above-mentioned known ones, i.e., mono-methyl-lysozyme and mono-guanidyl-lysozyme, namely methyl-lysozymes and guanidyl-lysozyme methyl esters both of which contain at least two methoxy radicals per molecule, such as methyl-lysozyme hemiesters, guanidyl-lysozymes with a higher degree of guanidylation and methyl esters of guanidyl-lysozymes, as well as the salts thereof with non-toxic, pharmaceutically-acceptable inorganic and organic acids, such as hydrochloric acid, sulphuric acid, phosphoric acid, acetic acid, citric acid, malic acid and tartaric acid. These new derivatives of lysozyme possess interesting and valuable biological properties, especially a strong anti-viral activity.

DETAILED DESCRIPTION OF THE INVENTION

With regard to the biological importance of lysozyme methyl esters and of guanidyl-lysozymes, whether esterified or not, we have noticed that they are able to form complexes with different biological substances having an electro-negative charge, especially viruses, including both RNA- and DNA-viruses; this formation of complexes between lysozyme basic derivatives and viruses brings about a neutralisation of the hemoagglutinating, infectious and pathogenic activity of viruses. If a fresh amount of APR8 virus, which causes influenza in humans, is inoculated into allantoic fluids and methyl-lysozyme is added, a precipitate is produced which can be clearly seen with the naked eye.

This precipitate may consist either of viral particles and methyl-lysozyme or of acidic allantoic substances and methyl-lysozyme or of both. In order to show the presence or absence of the virus in the precipitate, the analysis of the three main properties of APR8 virus was carried out; hemoagglutinating power, infection of embryonated eggs and immunogenic activity. The results obtained show that both in the supernatant liquid and in the precipitate, it is not possible to determine any hemoagglutinating activity, while the virus which has not been treated with methyl-lysozyme has a 1/80 activity.

With regard to the infectious power of the precipitate and of the supernatant liquid in embryonated eggs, we have found that the addition of methyl-lysozyme to the viral preparation results in the complete disappearance of the pathogenic property of APR8 virus.

With regard to immunogenic activity, we have studied the capacity of the precipitate to give rise to the formation of specific antibodies to APR8 influenza virus and of protecting mice against intranasal infection.

Our researches have shown that experimental animals, before treatment, do not possess any hemoagglutin-inhibiting antibodies for the APR8 influenza virus, which, on the contrary, appear after intraperitoneal inoculation of either live virus or of precipitate.

Both the animals treated with live virus and those treated with precipitate are actively protected when inoculated by the intranasal route with live influenza virus since, unlike the controls, they do not show any kind of lesion. The degree of protection determined by methyl-lysozyme was found to be higher than that obtained with untreated virus.

We then carried out similar investigations with a strain of herpetic virus cultivated on rabbit kidney tissue. The activity of the viral suspension (mouse, endocerebral route) was about 150,000 $LD_{50}$/ml; the viral suspension was then diluted with distilled water to an approximate concentration of 40,000 $LD_{50}$/ml, since the herpetic virus is better preserved in this diluent. An equal volume of a 0.2 percent solution of methyl-lysozyme in distilled water at pH 6.6–7 was added to this suspension. There was immediately observed the appearance of an opalescence similar to that of influenza virus, which is a sign of the formation of a complex between the virus and the lysozyme derivative.

After 40 minutes, mice were inoculated with the suspension by the intracerebral route; each mouse and the control animals received approximately 1,000 $LD_{50}$ of virus in 0.03 ml., a dose which killed all the control animals within 3 – 4 days. We observed that, if the herpetic virus is pre-treated with methyl-lysozyme, it loses its infectious activity, thus enabling a 100 percent survival of the animals. The results obtained are set out in the following Table.

TABLE

| Death rate of mice inoculated by the intracerebral route with | | | |
|---|---|---|---|
| | herpetic virus | herpetic virus + methyl-lysozyme | methyl-lysozyme |
| after 10 days | 5/5 | 0/5 | 0/3 |
| after 20 days | — | 2/5 | 0/3 |
| after 2 months | — | 2/5 | 0/3 |

(The first figure is the number of dead animals, while the second one is that of the total number of animals in each group).

It was then observed that even lower concentrations of methyl-lysozyme than those used in the previous test show inactivating properties on viruses.

On the basis of these tests, we concluded that methyl-lysozyme possesses a considerable inactivating power on herpes simplex and influenza viruses.

We have also carried out detailed investigations with guanidyl-methyl-lysozyme.

The technique used in these investigations was similar to that described above: equal volumes of a virus suspension and of guanidyl-methyl-lysozyme (0.2 percent concentration) were mixed together. After 20 minutes at ambient temperature, the mixture was inoculated by intracerebral route into mice. After the addition of guanidyl-methyl-lysozyme to the viral suspension, turbidity develops in the solution, as already observed, although to a minor extent, with lysozyme hydrochloride, lysozyme-methyl-esters and guanidyl-lysozyme.

Herpetic virus suspensions treated with quanidyl-methyl-lysozyme completely lose their infectious power; in fact, on the 15th day, all the mice treated with the viral suspension + guanidyl-methyl-lysozyme were still alive, whereas those treated with the viral suspension alone had already died.

This confirms the importance of the esterification of the lysozyme carboxylic groups with regard to their antiviral action.

The increase in the basic property of the lysozyme molecule, which is a characteristic of the new lysozyme derivatives according to the present invention, not only induces an antiviral activity but also a marked antagonist action to inflammatory processes, such as are caused by croton oil and diphtheria toxin, while the above-mentioned new derivatives also effectively combat oedemas caused by the injection of egg white into rats' paws.

The following Examples are given for the purpose of illustrating the present invention:-

EXAMPLE 1

100 g. lysozyme hydrochloride are suspended in a solution of 80 ml. hydrochloric acid in 10 litres methanol. The reaction mixture is left to stand for several hours, with occasional stirring. The solid material is then separated by filtration and washed first with methanol and then with ether. After further filtration and drying under vacuum at ambient temperature, lysozyme methyl ester hydrochloride is obtained in almost theoretical yield (98.2 g.).

The product is a colourless and crystalline solid which is very soluble in water.

Quantitative analysis of methoxy radicals, carried out in known manner, showed that 5 of the 10 carboxyl groups present in lysozyme are esterified.

EXAMPLE 2

50 g. lysozyme hydrochloride are treated with methanol in the presence of concentrated hydrochloric acid in the manner described in Example 1, except that the reaction mixture was allowed to react for a much longer period of time. Lysozyme methyl ester hydrochloride is separated and a quantitative determination of the methoxy radicals shows that the lysozyme has been almost completely esterified.

EXAMPLE 3

60 g. guanidyl-lysozyme hydrochloride are esterified with methanol in the presence of concentrated hydrochloric acid in the manner described in Example 1, the mixture being allowed to react for a long period of time. The product is isolated as described in Example 1 and quanidyl-lysozyme methyl ester hydrochloride is obtained in the form of a colourless, crystalline solid which is very soluble in water.

Quantitative analysis shows the presence of 3 methoxy radicals per mole of lysozyme.

The present invention also includes within its scope pharmaceutical compositions containing one or more of the new basic lysozyme derivatives. These pharmaceutical compositions can be administered orally or parenterally in admixture with a solid or liquid pharmaceutical carrier.

Solid compositions for oral administration include compressed tablets, pills, dispersible powders and granules. In such solid compositions, at least one of the new salts is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing at least one of the new salts, with or without the addition of diluents or excipients.

Preparations according to the present invention for parenteral administration include sterile aqueous or nonaqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active ingredient in the compositions of the present invention may be varied, it being necessary that it should constitute a proportion such that a suitable dosage for the desired therapeutic effect shall be obtained. In general, the preparations of the present invention should be administered, in the case of oral administration, to give 0.5 to 5 g. of active substance per day and, in the case of parenteral administration, 0.1 to 4 g. of active substance per day.

The following Examples illustrate pharmaceutical compositions according to the present invention:

EXAMPLE 4

500 mg. tablets are prepared containing:
| | |
|---|---|
| lysozyme methyl ester hydrochloric (see Example 1) | 250 mg. |
| starch | 150 mg. |
| lactose | 95 mg. |
| magnesium stearate | 5 mg. |

EXAMPLE 5

10 g. of the lysozyme methyl ester hydrochloride prepared according to Example 2 are dissolved in 100 ml. sterile physiological saline. The solution obtained is suitable for administration by injection.

The pharmaceutical compositions illustrated in Examples 4 to 5 above show a valuable anti-viral activity when administered to humans.

We claim:

1. A method of treating influenza or herpetic viral infections, which comprises administering to a host a compound selected from the group consisting of guanidyl-lysozyme containing at least two guanidyl radicals per molecule, the methyl esters of lysozyme containing at least two methoxy radicals per molecule, the methyl esters of guanidyl-lysozymes containing at least two methoxy radicals per molecule and the salts thereof with non-toxic, pharmaceutically acceptable inorganic and organic acids, in an amount of 0.5–5 g orally per day or 0.1–4 g parenterally per day.

* * * * *